UNITED STATES PATENT OFFICE.

DEANE BURNS, OF LAKEWOOD, OHIO, ASSIGNOR, BY MESNE ASSIGNMENTS, TO NATIONAL CARBON COMPANY, INC., A CORPORATION OF NEW YORK.

PURIFICATION OF PRECIPITATES.

1,272,375.  Specification of Letters Patent.  Patented July 16, 1918.

No Drawing.  Application filed September 19, 1914. Serial No. 862,561.

*To all whom it may concern:*

Be it known that I, DEANE BURNS, a citizen of the United States, residing at Lakewood, in the county of Cuyahoga and State of Ohio, have invented a certain new and useful Improvement in the Purification of Precipitates, of which the following is a full, clear, and exact description.

My invention in its broad aspect relates to the elimination of occluded material from a precipitate, and the particular application of the process as described herein relates to a method of treating sulfates of a rare-earth metal to convert it into fluorids for use in arc lamp electrodes. As is well known, these sulfates are secured by the treatment of monazite sands in the process of extracting thorium compounds for Welsbach mantles. The material remaining after this treatment is known to the trade as Welsbach or cerium residue. This residue consists principally of cerium salts mixed with other salts of rare-earth metals together with impurities.

The prior process of obtaining fluorids of rare-earth metals has been to treat the cerium and other sulfates of the Welsbach residue with hydrofluoric acid to precipitate fluorids of rare-earth metals. This treatment, however, produces a product with only about 23% of fluorin content, whereas the theoretical amount should be almost 29%. In addition to this, there is approximately 3% of sulfates that cannot be washed out. I have not been able to definitely determine the chemical form of this sulfate, but am inclined to think that it is occluded sulfuric acid, though it may be a sulfate of some metal constituent of the mixture, such as a sulfate of a rare-earth metal for instance.

The sulfate content in fluorids of rare-earth metals seems to make the product hygroscopic, which is objectionable. It is necessary to calcine the fluorids in order to make the product dense and non-shrinking when incorporated in electrodes, and if the product contains water a reaction will be set up during calcination in accordance with the following equation:

$$2REF_3 + 3H_2O = RE_2O_3 + 6HF,$$

where RE stands for various rare-earth metals with cerium as the principal constituent. This means that if the fluorids of rare-earth metals are hygroscopic to any extent a definite amount of rare-earth oxid will be formed during calcination and an equivalent amount of hydrofluoric acid liberated. Inasmuch as fluorid compounds of the rare-earth metals are more efficient and suitable for arc lamp electrodes, it is objectionable to have any considerable part of them changed over into the oxid in their preparation.

The sulfate content of the fluorids also has another objectionable feature when used in cored electrodes in which silicates of sodium or potassium compose the binding medium, as it causes the silicates to gelatinize to such an extent that the core paste cannot be readily squirted into the carbon shells.

My invention is directed toward the elimination of the sulfates from mixtures of the fluorids of the rare-earth metals and to the increasing of the fluorin content. The process by which these results are accomplished will now be described.

A solution of sulfates of rare-earth metals, which may be obtained by extraction from the Welsbach or cerium residue, is poured into a tank containing hydrofluoric acid which precipitates the fluorids of the rare-earth metals. After the precipitate has settled the supernatant liquid is drawn off and the precipitate is washed to free it of soluble sulfates and other impurities. The sludge is filter pressed and the desired amount of sodium fluorid solution is mixed in with it. The mixture is then dried at a moderate heat to eliminate the water, and is then gradually calcined to a temperature ranging between 500° C. and 800° C., preferably with exclusion of air. In practice it has been found that the preferable temperature is between 650° and 690°. When fluorids of the rare-earth metals are precipitated they contain about 3% of sulfates, as $SO_3$, that cannot be washed out. The sodium fluorid reacts on these in accordance with the following equation:

$$mSO_4 + 2NaF = Na_2SO_4 + mF_2,$$

where $m$ represents generally the positive radical. This reaction probably takes place slowly at ordinary temperatures, but when the product is calcined the reaction is complete. From the above equation it will be seen that in case the sulfate is in the form of sulfates of rare-earth metals, fluorids of rare-earth metals will be formed which will further increase the fluorin content. The calcined product is crushed and washed with water to remove the soluble sodium sulfate. After the mass has been washed it is dried at about 110° C. and is ready for use in electrode mixes.

While I have described the preferred process for bringing about the desired reaction, this may be modified. The sulfates of rare-earth metals solution may be added to an excess of sodium fluorid solution to precipitate the fluorids of rare-earth metals. The precipitate is then washed incompletely so that there remains enough sodium fluorid solution mixed with the sludge to bring about the reaction which results in the ultimate removal of the sulfate content as described above.

It also would not be necessary to add the correct amount of sodium fluorid as described in the preferred process, but an excess may be added to the sludge before it is filter pressed. This leaves more than enough sodium fluorid to bring about the reaction.

The dry fluorids of rare-earth metals may also be mixed with dry sodium fluorid and ground together to intimately mix the same. The mass is then calcined as previously described to bring about the reaction.

While I have described the use of sodium fluorid, potassium fluorid works equally as well, though it is not so cheap. Other alkali fluorids can also be used, as the invention essentially consists in the use of a soluble fluorid that will react on the impurity to transform it into a soluble salt so that it can be washed out.

My invention is not only useful in preparing mixes for arc lamp electrodes, but also is of advantage in preparation of metallic cerium for pyrophoric alloys. In such process cerium is produced by electrolyzing fused cerium or other fluorids of rare-earth metals. If there is any water contained in the fluorids it will be driven off in the form of steam which reacts with the fluorids to form oxid of rare-earth metals and hydrofluoric acid. This has been found so objectionable that in the past the water has been removed from the cerium fluorid by the use of absolute alcohol. As is well known, absolute alcohol is very expensive, and by using my process for the formation of cerium fluorid a non-hygroscopic anhydrous fluorid will be obtained at much less cost. If pure metallic cerium is desired it will, of course, be understood that salts of this material will be separated from the other constituents of the Welsbach residue by known means. Since cerium is the major part of the Welsbach residue it may be unnecessary to make this separation.

There is a known way for forming fluorids of rare-earth metals free from sulfates which consists in treating the extract from Welsbach residue with a carbonate to form insoluble rare-earth carbonates from which the sulfates can be readily washed. The carbonates are then treated with boiling hydrofluoric acid to form the fluorids of rare-earth metals. This process requires an additional step and is otherwise not so satisfactory as the safe handling of boiling hyrofluoric acid is a difficult problem. The fluorids obtained by precipitation are dense and almost glassy in condition and appearance, while those obtained by treating an insoluble compound of rare-earth metals, such as the carbonate, with boiling hydrofluoric acid are light and earthy in appearance. The dense precipitated form is much better for arc lamp electrodes.

While I have explained the complete process of obtaining non-hygroscopic fluorids of rare earth metals, free from sulfates, direct from the Welsbach residue, it will, of course, be apparent that the invention also includes the use of sodium or other fluorid to free fluorids of rare-earth metals from sulfates regardless of where the fluorids are obtained.

The process is not limited to the purification of the specific salt mentioned, viz., fluorids of rare-earth metals, but can be used to eliminate occluded material in general from a precipitate.

Having described my invention, what I claim is:

1. The steps in the process of freeing precipitated fluorids of rare-earth metals of occluded rare-earth metal sulfates, which consists in mixing them with a fluorid adapted to react with said occluded sulfates on application of heat, and applying heat to bring about the reaction.

2. The steps in the process of preparing fluorids of rare-earth metals which consists in adding a solution of a soluble salt of a rare-earth metal to hydrofluoric acid, drying the precipitate, mixing it with a fluorid of an alkali metal and calcining it to above 500° C.

3. The steps in the process of freeing preciptated fluorids of rare-earth metals of another occluded rare-earth compound, which consists in mixing them with sodium fluorid and calcining to a temperature above 500° C.

4. The process of eliminating sulfates from fluorids of rare-earth metals, which consists in mixing said fluorids with sodium fluorid, calcining it to a temperature above substantially 500° C. and washing out the soluble salts thus formed.

In testimony whereof, I hereunto affix my signature.

DEANE BURNS.

Witnesses:
H. G. GROVER,
L. E. WRIGHT.